United States Patent [19]

Knightly

[11] Patent Number: 4,684,526
[45] Date of Patent: Aug. 4, 1987

[54] ANTISTALING/CONDITIONING AGENT IN PRODUCING BAKERY PRODUCTS

[76] Inventor: William H. Knightly, 146 Devonshire Rd., Wilmington, Del. 19803

[21] Appl. No.: 685,155

[22] Filed: Dec. 21, 1984

[51] Int. Cl.4 ........................... A21D 2/08; A23J 7/00
[52] U.S. Cl. ........................................ 426/19; 426/24; 426/321; 426/549; 426/653; 426/662
[58] Field of Search ............... 426/321, 549, 662, 654, 426/653, 24, 19

[56] References Cited

U.S. PATENT DOCUMENTS

| | | | |
|---|---|---|---|
| 2,952,545 | 9/1960 | Pfrengle et al. | 426/653 |
| 2,970,913 | 2/1961 | Loewenstein | 426/654 |
| 3,180,736 | 4/1965 | Landfried | 426/653 |
| 3,223,532 | 12/1965 | Pinkalla et al. | 426/653 |
| 3,282,705 | 11/1966 | Hansen | 426/654 |
| 3,369,907 | 2/1968 | Knightly . | |
| 3,388,999 | 6/1968 | Kuhrt et al. | 426/653 |
| 3,394,009 | 7/1968 | Knightly . | |
| 3,485,639 | 12/1969 | Knightly . | |
| 3,547,655 | 12/1970 | Knightly . | |
| 3,549,382 | 12/1970 | Hansen | 426/654 |
| 4,178,393 | 12/1979 | Gregersen | 426/662 |
| 4,315,041 | 2/1982 | Fukuda et al. | 426/653 |
| 4,363,826 | 12/1982 | Fukuda et al. | 426/653 |

OTHER PUBLICATIONS

"New Approach Lecithin Dispersible Lecithin Baking Ingredient", Food Technology Products, Chicago, Illinois.
William H. Knightly, "The Staling of Bread", *Baker's Digest*, vol. 51, No. 5, pp. 52–56, 144–150 (1977).
"Lecithin Nature's Own Emulsifier", Lucas Meyer, Inc.
Kirk and Othmer, *Encyclopedia of Chemical Technology*, vol. 12, Second Edition, p. 356.

*Primary Examiner*—Raymond N. Jones
*Assistant Examiner*—Marianne M. Cintins
*Attorney, Agent, or Firm*—Connolly & Hutz

[57] ABSTRACT

A blend of a hydrophillic lecithin having an HLB value of at least about 8 and at least one of a monoglyceride, lactic acid esterified monoglyceride, succinic acid esterified monoglyceride, maleic acid esterified monoglyceride or edible salts of stearyl lactylic acid is disclosed. The blend synergistically improves both staling inhibition of a baked food product and also dough conditioning when added to a formulation for a baked food product prior to baking.

11 Claims, No Drawings

ANTISTALING/CONDITIONING AGENT IN PRODUCING BAKERY PRODUCTS

BACKGROUND OF THE INVENTION

The "staling" of bread, cakes and other bakery products is commonly believed to be the result of natural chemical and physical changes which occur in the finished baked product upon storage under normal conditions. The mechanisms and contributing factors for those chemical and physical changes are known to be complex and varied. As a result, not all the mechanisms and contributing factors are yet fully understood. However, the commonly accepted primary cause of crumb firming among cereal chemists is the retrogradation or recrystallization of the components of starch, amylose and/or amylopectin after gelatinization. (See Knightly, "The Staling of Bread", *Bakers Digest*, Vol. 51, No. 5, pp. 52-56, 144-150 (1977)). Whatever the cause of "staling", it is known that its onset is quite fast following baking unless retarded by certain antistaling additives. Indeed, under certain accepted definitions, bread baked without known antistaling additives could be considered as stale bread after only a matter of a few hours following baking.

Antistaling agents normally used in the production of breads, cakes and other bakery products include monoglycerides and mixtures of monoglycerides with diglycerides, U.S. Pat. No. 3,547,655 discloses an improved antistaling agent which is a combination of monoglycerides and a synthetic polyethoxylated derivative of a fatty acid ester of a hexitol, hexitan or an isohexide.

U.S. Pat. Nos. 369,907 and 3,485,639 disclose an antistaling/mold inhibiting agent which is a combination of monoglycerides with a synthetic lower monocarboxylic acid ester of a polyhydric alcohol.

U.S Pat. No. 3,394,009 discloses a synthetic ester of glycerine and a lower carboxylic acid such as propionic acid as an antistaling agent for bakery products.

SUMMARY OF THE INVENTION

A need has long existed to provide baked goods with an antistaling agent which does not contain a synthetic chemical ingredient. Accordingly, it is one object of this invention to provide an antistaling agent which contains only ingredients obtained from natural products.

In meeting that objective it was also unexpectedly discovered that the antistaling agent of this invention which is a blend of a monoglyceride with a hydrophillic lecithin fraction provides synergistically superior antistaling characteristics as well as dough conditioning properties. Thus, it is another object of this invention to provide an antistaling agent and dough conditioning agent which can be used at reduced levels or concentrations due to synergism in the preparation of baked goods to produce comparable or superior results in the finished product.

Yet another objective of the present invention is to provide a dough for producing baked goods containing a dough conditioning agent which facilitates machinability, improves workability, provides a dryer, more extensible dough and in general assists in the continuous production of the baked goods.

It was further discovered that the antistaling/conditioning agent of this invention produces baked goods with an improved texture, grain, volume and symmetry.

The foregoing objects and others are accomplished by adding to a dough formulation for producing a baked product an antistaling/conditioning effective amount of a blend of a monoglyceride and a hydrophillic fraction of lecithin.

DETAILED DESCRIPTION

The monoglycerides used in this invention are conventional monoglycerides long used in the baking industry. In accordance with prior terminology in the art, the term "monoglyceride" includes monoesters of glycerine as well as mixed monoesters and diesters of glycerine. Typical monoglyceride compositions suitable for use in accordance with the present invention are, for example, a mixture of monoglycerides and diglycerides (ca. 55% alpha mono) formed from fatty acids from a blend of cottonseed oil and fully hydrogenated cottonseed oil, having an iodine value of about 71, a mixture of monoglycerides and diglycerides (ca. 56% alpha mono) formed from fatty acids from a blend of lard and tallow having an iodine value of about 47 and a mixture of monoglycerides and diglycerides (ca. 56% alpha mono) formed from fatty acids from partially hydrogenated tallow having an iodine value of about 35.

The fatty acid monoglycerides suitable for use in accordance with this invention may be prepared by conventional methods of glycerolysis of edible fats and oils, i.e., by reacting glycerine with a fatty acid glyceride or i.e., by reacting glycerine with a fatty acid glyceride or other fatty acid ester, or by directly esterifying glycerine with a fatty acid having from about 12 to about 22 carbon atoms. Examples of the fatty acid monoglycerides which may be used as the monoglyceride constituent of the antistalant/conditioner of the present invention are glycerol monostearate, glycerol monooleate and glycerol monopalmitate. Glycerolysis reaction products, i.e., the mono and diglyceride mixtures which are the result of glycerolysis containing usually 40-65% of the monoester fraction, may also be used. The cost of concentration, as by distillation, may add significantly to the cost of the monoester fraction of antistaling blends of this invention. Nevertheless, one particularly preferred monoglyceride is a fully hydrogenated, high-purity monoglyceride obtained from soybean oil. That monoglyceride has about 95% monoester (about 90% alpha ester and 5% beta-ester).

In addition to the monoglycerides defined above, the term monoglyceride includes the heretofore defined monoglycerides which have been esterified (primarily at the beta position) with one additional organic acid, such as lactic acid, succinic acid or maleic acid. Also, in the baking industry certain edible salts of stearyl lactylic acid are known to be functional equivalents of the monoglycerides and can be used in place of the monoglycerides in this invention. Thus, the antistaling effects of sodium, potassium or calcium salts of stearyl lactylic acid can also be synergistically improved by this invention.

The second of the two synergistic components of the antistaling/conditioning agent of this invention is a hydrophillic fraction of lecithin. This is to be distinguished from ordinary lecithin.

During times of shortage and austerity in the past, it has been suggested that ordinary lecithin might be used as an egg yolk or fat substitute in baked goods. Moreover, it has been suggested that in a monoglyceride/water emulsion from 0.5-1% ordinary lecithin could be used as a stabilizer. A general discussion of use of ordinary lecithin in baked products appears in Kirk and Othmer, *Encylopedia of Chemical Technology,* Vol. 12, Second Edition, page 356.

Lecithin is found in all living organisms and has phosphorus-containing lipid (a phosphatide) components which are glycerol triesters of two fatty acids and either phosphoric acid or choline. Thus, natural lecithin phospho-lipids are a mixture of a plurality of chemically distinct materials. The five possible phospho-lipids are:

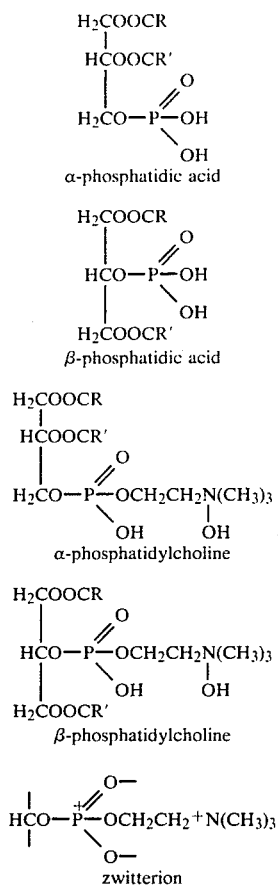

wherein R and R' are alkyl or alkenyl of 11 to 21 carbon atoms.

The lecithin of commerce and of technical importance is predominately soybean lecithin. Commercial soybean lecithin (frequently called simply "lecithin" or "commercial lecithin") is the phosphatide rich residue obtained in the manufacture of soybean oil. However, that residue contains about two-thirds phosphatides with the balance being soybean glyceride oils.

Due to the differences in chemical and physical properties of the soybean glyceride oil and phosphatide component of commercial lecithin and well as among the individual phosphatides, separation of lecithin into fractions rich in one or more of its components is possible. See: Kirk and Other, *Encylopedia of Chemical Technology,* Vol. 12, Second Ed., p. 345. The hydrophillic lecithin fraction used in the present invention is commercial soybean lecithin which has been treated to reduce the hydrophobic character of certain components thereby leaving a fraction with an enhanced hydrophillic character.

Such hydrophillic lecithin fractions are commercially available and are sold, for example, by Lucas Meyer, Incorporated, of Decatur, Ill. under the tradename "EMULFLUID". One fraction, "EMULFLUID A", is prepared by treating lecithin with fatty acids whereby part of the phosphatidyl ethanol amine is converted to the highly polar N-acyl phosphatidyl ethanol amine. Another fraction, "EMULFLUID E", is produced by the partial hydrolysis of lecithin whereby the lysophopholipid content is increased to 10-15%. Both the N-acyl phosphatidyl of "EMULFLUID A" and the lysophopholipid of "EMULFLUID E" are identified as natural substances but their occurance in crude lecithin is quite small.

The hydrophillic lecithin fractions used in this invention are those having an HLB value of six or more. One preferred HLB value is about 8 and a more preferred value is about 10. The HLB value is a measure of the degree of hydrophillicity of a material. See: Griffin, *J. Soc. Cosmetic Chemists,* Vol. 1, page 311 (1949); Becher, "Emulsions: Theory and Practice", Reinhold Publishing Corp., New York, pages 188-199 (1957); Becher et al, *J. Amer. Oil Chemists Soc.,* Vol. 41, No. 3, pages 169-172 (1964). The value is determined by determining the molecular percentage of hydrophillic moieties in the overall molecule divided by the arbitrary number five. Typical fatty acid monoglycerides have an HLB of about 3.5 and lecithin has an HLB of about 3 to 4. An HLB of 10 would indicate half hydrophobic character and half hydrophillic. An HLB of 5 would indicate 75% hydrophobic character. Thus, the HLB of 3 to 4 for ordinary lecithin indicates a high level of hydrophobic character.

Monoglyceride and hydrophillic lecithin blends used in the invention can be employed in a wide ratio range of about 90:10 to about 10:90 parts by weight of monoglyceride : hydrophillic lecithin. A particularly suitable antistaling agent contains about 10 to 30% by weight of hydrophillic lecithin. Most preferred is an agent produced by co-spraying melted monoglyceride and liquid hydrophillic lecithin into a cooling chamber to produce a solid free flowing powder blend having about 23-25%, lecithin.

Although a monoglyceride/hydrophillic lecithin mixture in the form of a free flowing powder is preferred, a liquid or plastic mixture would be equally effective in the process of this invention. Also, each of the two components may be added separately to the dough formula but this procedure is less preferred because of the greater difficulty in producing a uniform dispersion of the hydrophobic monoglyceride in an aqueous system such as dough or batter. Unless a substantially uniform dispersion is obtained, the synergistic effects of the combination will be mitigated. The antistaling/conditioning agent of this invention is blended with and incorporated into bakery dough in the range of about 0.15 to 1.0% based on flour weight in the dough with a range of 0.3 to 0.5% being preferred. In cake batter, higher levels are required and an amount of about 1.0 to 3.0% based on flour weight is preferred.

The antistaling/conditioning agent of this invention provides superior starch complexing and aerating in baked foods. Because of its improved dispersability and hydrophillic character, it exhibits the noted improved staling inhibition and dough conditioning in yeast raised goods, and additionally improved aerating and moisture retention properties in cakes.

The following examples further illustrate this invention. They set forth as a further description of certain embodiments but are not to be construed as limiting the invention thereto.

EXAMPLE I

About 25% by weight of a liquid hydrophillic lecithin (HLB 8) and 75% by weight of a melted fully saturated distilled monoglyceride obtained from soybean oil were cosprayed into a cooling chamber. The cosprayed materials are intimately mixed in the spray droplets and cooled in the chamber thereby solidifying the two materials. The powder blend has the following characteristics:

| Monoester Content | min 70% |
|---|---|
| Iodine Value | 12-17 |
| Acetone Insolubles | min 15 |
| F.F.A. | max 5 |
| Melting Point | 62° C. |
| Free Glycerol | max 1% |
| Form | fine powder |

EXAMPLES II AND III

The test bread formula used in this evaluation is a straight dough formula, as follows:

| | Percent | Lbs, Ozs |
|---|---|---|
| Flour | 100% | 12 lb 8 oz |
| Water | 54.0 | 6 lb 12 oz |
| Yeast | 4.0 | 8 oz |
| Yeast Food | — | ½ Tab. |
| Ascorbic Acid | (250 mg.) | 1 Tab. |
| Sugar | 10.0 | 1 lb 4 oz |
| Shortening | 4.0 | 8 oz |
| Milk | 4.0 | 8 oz |
| Salt | 1.5 | 3 oz |
| Antistaling/conditioner | 0.5 | 1 oz |
| Vinegar 50 grain (mold inhibitor) | 4.0 | 8 oz |

Procedure:

The ingredients were mixed in a Hobart mixer, using a standard dough hook, at 83° F. for 18 minutes and then allowed to ferment ("floor time") for 15 minutes. The dough was then divided into 19 oz pieces, rounded, sheeted and moulded. The moulded pieces were then placed in baking pans and allowed to proof to height (about ¼inch above lip of pan) for 55 minutes at 98° F. The dough was then baked at 405° F. for 27 minutes. The loaves were permitted to cool on a wire rack and then sealed in plastic bags.

After a three and six day storage period at room temperature, test loaves were removed from the bags and then sliced in ½inch slices, using an Oliver Slicing Machine (No. 777). The middle ten slices were used for testing on the Instron Universal Tensile Tester and the end slices discarded. (Test conditions were: Instron Model 1122 Standard Speed. Compression Load Cell No. CB, Full Scale Load 1000 grams. Compressibility Distance —4 mm (0.16 inch) Compression plunger disc 1 inch diameter. Cross Head speed —5 inches with minimum Chart Speed of 20 inch/minute). One compression test was conducted on the center of each test slice and recorded as the grams of force required to compress the crumb a distance of 4 mm. A Softness Index was calculated by dividing the average grams of force required to compress the comparison loaf into the average grams of force required to compress the test loaf. If the test loaf was softer, a value less than 1 is obtained; if firmer, greater than 1.

The loaves and slices were also evaluated for moistness, grain, texture and symmetry.

| Formula Change | Example II (Invention) | Example III (Comparison) |
|---|---|---|
| A. 0.5% Antistaling/conditioner | 1 oz. Example I | 1 oz. Mighty Soft[1] |
| B. Example II required a 2% increase in water added to obtain proper dough consistency. | | |

[1]Mighty-Soft is commercial product of Eastmann Chemical Co., Kingsport, TN which is presently the most widely used powdered monoglyceride in the baking industry. It is a blend of saturated and unsaturated distilled monoglycerides with an Iodine Value of about 30.

The product breads of Example II exhibited greater over spring, possessed a softer feel, had a thinner crust and the crumb was moister with a better texture and finer (closer) grain than the comparison bread of Example III.

Analysis of crumb firmness after 6 days, using the Instron Compression data showed that the test bread containing the antistaling/conditioner of Example II (invention) was significantly softer than the comparison bread of Example III.

Average compression forces after three days for test loaves were as follows:

| Example II | 290 grams |
|---|---|
| Example III | 339 grams |
| Softener Index = 290/339 = .855 | |

These data indicate that the test bread was only 85.5% as firm as the comparative bread which contained what is considered to be the most effective powdered antistaling agent currently commercially available.

A second confirmatory bake test was conducted. In the second bake test, 1% additional yeast was added. Results obtained were essentially the same as those obtained with the first bake test. Again, 2% additional water was required and the doughs were more extensible with Example II. These loaves proofed 5 minutes faster, had better oven spring and loaf symmetry. Grain and texture were superior and the crumb was softer to the touch and more moist when eaten.

A third bake test was conducted. Again the improvements noted with the invention Example II in the first two bakings were confirmed. Improvements included improved water absorption, drier more extensible doughs, better oven spring and loaf symmetry, as well as better grain, texture softness and moistness in the crumb.

Additional Instron Compression testing of the crumb of the loaves of Test 3 was conducted. Data obtained after 3 days were as follows:

| Example II | 368.8 grams |
|---|---|
| Example III | 451.7 grams |
| Staling Index 368.8/451.7 = .816 | |

These data indicate that the test bread of Example II is only 81.6% as firm as that of the comparative Example III.

In summary, the improved dough conditioning of the invention antistaling/conditioner is demonstrated by improved water absorption of up to 2%, drier, more extensible (more machinable) doughs, better over spring (increased volume due to heat expansion), better symmetry and thinner, finer crust. Improved crumb grain and texture are also a function of dough condition.

Improved softness was observed by feel and demonstrated mechanically using the Instron compression method.

What is claimed is:

1. In a method of preparing a baked food product by mixing ingredients comprising flour, water, a leavening agent, and an antistaling/conditioning agent, and then baking the mixed ingredients, the improvement comprising said antistaling/conditioning agent consisting essentially of a blend of
  (i) 90 to 10 parts by weight of the blend of a hydrophillic fraction of naturally occurring lecithins having an HLB value of at least about 8, and
  (ii) 10 to 90 parts by weight of the blend of at least one of a monoglyceride, lactic acid esterified monoglyceride, succinic acid esterified monoglyceride, maleic acid esterified monoglyceride or edible salts of stearyl lactylic acid.

2. The method according to claim 1 wherein the amount of antistaling/conditioning agent is from about 0.15 to 3% based on the flour weight.

3. The method according to claim 1 wherein the baked food product is a yeast leavened bread and the amount of antistaling/conditioning agent is 0.15 to 1% based on flour weight.

4. The method according to claim 1 wherein the hydrophillic lecithin fraction has an HLB value of at least 10.

5. The method according to claim 1 wherein the blend contains from 90 to 10 parts by weight of a monoglyceride and 70 to 30 parts by weight of a hydrophillic lecithin fraction.

6. The method according to claim 1 wherein the antistaling/conditioning agent is added to said mixture in the form of a free flowing powder containing about 23-25% by weight of the hydrophillic lecithin fraction.

7. The method according to claim 6 wherein the monoglyceride is a fully hydrogenated distilled monoglyceride obtained from soybean oil and having a monoester content of about 95% by weight.

8. The method according to claim 1 wherein the antistaling/conditioning agent consists essentially of about 10 to 30% by weight of hydrophillic lecithin and 70 to 90% of a monoglyceride.

9. The method according to claim 8 wherein the agent has about 23-25% hydrophillic lecithin and the monoglyceride is a soybean monoglyceride containing about 95% by weight of glycerine monoester.

10. An antistaling/conditioning agent for use as an additive in a process for producing baked food products which consists essentially of about 10 to 30% by weight of a hydrophillic fraction of naturally occurring lecithin having an HLB value of at least about 8 and 70 to 90% by weight of a monoglyceride or a monoglyceride mixed with lactic acid esterified monoglyceride, succinic acid esterified monoglyceride, maleic acid esterified monoglyceride or edible salts of stearyl lactylic acid.

11. An antistaling/conditioning agent according to claim 10 consisting essentially of hydrophillic lecithin and a monoglyceride.

* * * * *